Aug. 1, 1961  A. L. BARACH ET AL  2,994,405
AIR PURIFIER
Filed Dec. 31, 1958  2 Sheets-Sheet 1
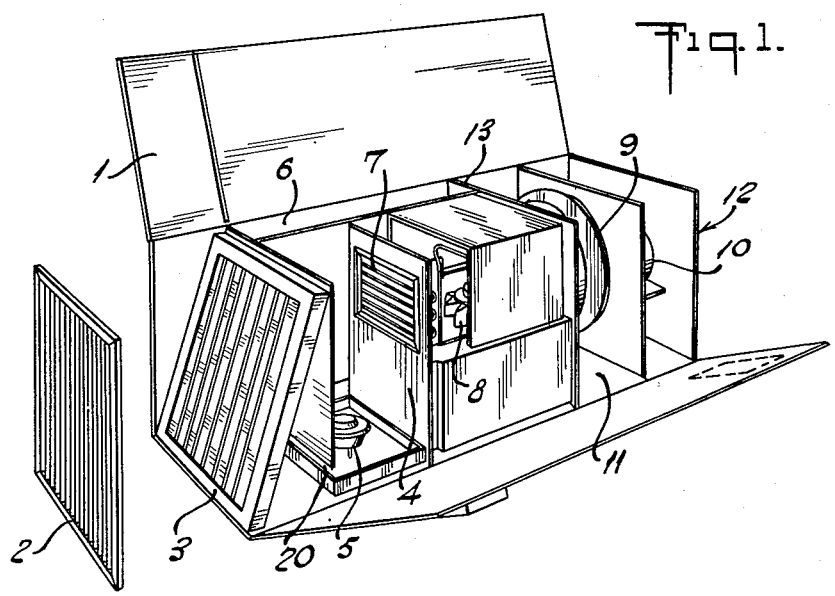
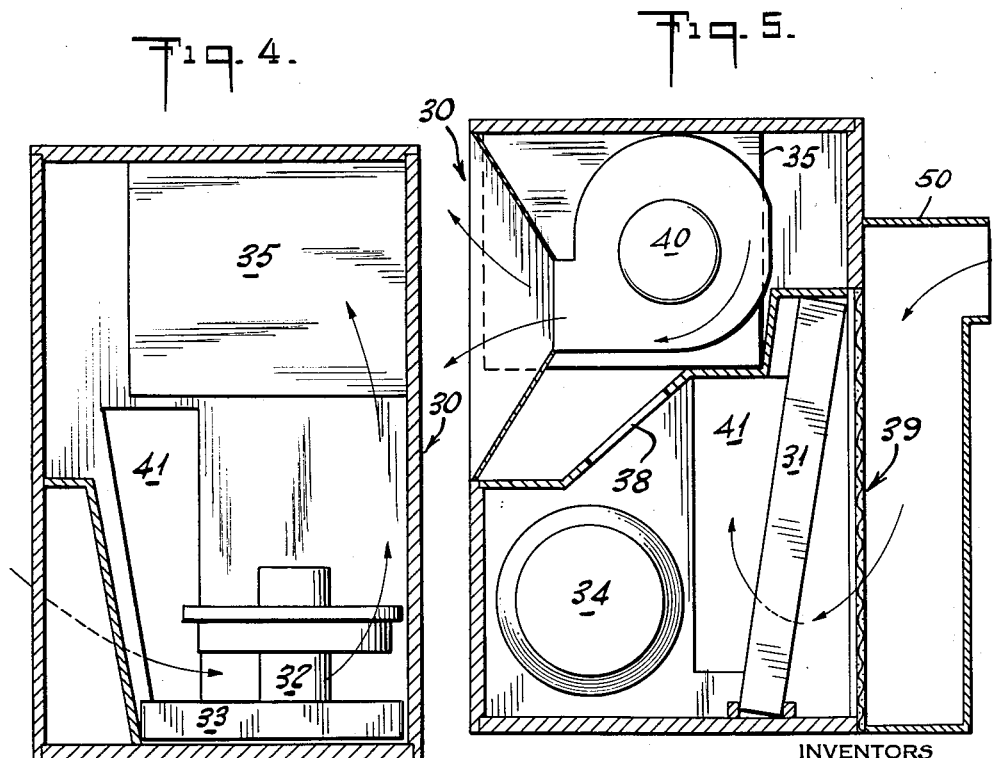
INVENTORS
ALVAN L. BARACH
WILLIAM B. HALL
BY
James A. Heilman
ATTORNEY INVENTORS
ALYAN L. BARACH
WILLIAM B. HALL
BY James M. Heilman
ATTORNEY United States Patent Office 2,994,405
Patented Aug. 1, 1961

2,994,405
AIR PURIFIER
Alvan L. Barach, New York, N.Y., and William B. Hall, Upper Montclair, N.J., assignors to The Donald Deskey Corporation, New York, N.Y., a corporation of New York
Filed Dec. 31, 1958, Ser. No. 784,386
8 Claims. (Cl. 183—7)

The present invention is generally concerned with the conditioning of air, but is more particularly directed towards the purification of air by the removal of objectionable and harmful constituents from air by a particular novel process and unique apparatus therefor.

It is well known that the control of air pollution in modern society is becoming an increasingly difficult and vexing problem. There exists ample and widespread evidence that contaminants in air adversely affect the health of young and old. Illnesses such as bronchitis, asthma and the like are greatly aggravated, and in many instances, actually caused by harmful and irritating contaminants in the air breathed. These contaminants also cause irritation and soreness of the eyes, nose and throat. The principal cause of spasm of the bronchi, such as occurs in bronchial asthma, pulmonary emphysema and allied broncho-pulmonary diseases as well as certain forms of heart failure may be attributed to the presence of sulphur dioxide in the air as well as the sulphuric acid and sulphurous acid which occur on damp days. Thus, the present invention is concerned with an improved process and apparatus for the efficient and very effective removal of sulphur dioxide, its related compounds, and other harmful corrosive constituents from air. In addition, pollens, dust and other undesirable matter are effectively removed by the apparatus.

Thus, an object of this invention is to provide a process and apparatus whereby air-borne, objectionable and harmful constituents and certain water soluble deleterious odors may be effectively removed in an inexpensive manner without introducing new contaminants.

The unique air purifier of the present invention recirculates the air being treated under controlled conditions in the area it is utilized at a rate which may vary, depending upon other operating conditions. In essence, the process and apparatus of the present invention handles the air in a series of integrated operations which, in essence, comprises passing the air to be purified through an electric field and filter, then selectively separating or segregating an amount of air to be passed through a humidification stage, a dehumidifying section, and thereafter combining this dehumidified air with the larger quantity of air which bypasses this humidification and dehumidification section.

The process and apparatus of the present invention may be more readily understood by reference to the drawings illustrating embodiments of the same.

FIGURE 1 illustrates one adaptation of the invention wherein air is introduced at one end of the purifier and discharged at the other end.

FIGURES 2, 3, 4 and 5 illustrate another adaptation of the invention wherein air is introduced at the back of the purifier and wherein a portion of the air bypasses the humidification section.

Figure 2:
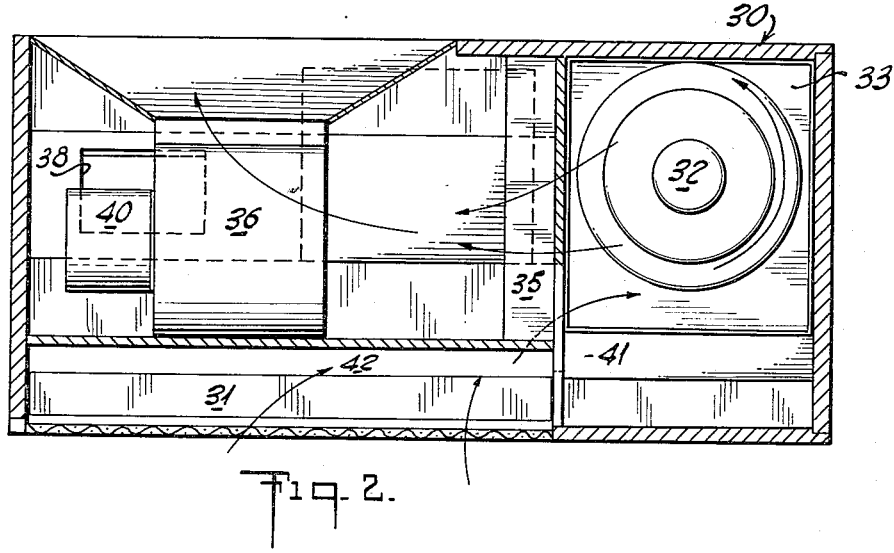

Referring specifically to FIGURE 1, the apparatus comprises a housing 1 which is preferably of oblong, rectangular structure, and which has a hinged top and hinged front or equivalent means for its ready removal so as to provide ready access to the working areas. The size of the housing may vary appreciably depending upon the amount of air to be circulated. For example, if the apparatus is to circulate about 400 cubic feet of air per minute, with a pressure drop of about .3 inches of water, the housing would preferably be about 3½ feet long, about 3 feet high, and about 20 inches wide. It is, however, to be understood that these dimensions may vary depending upon other operating conditions, and the designed overall capacity of the unit.

At the end of the apparatus there is provided an inlet grill 2 which serves to protect the electrostatic filter field unit. The structure of this grill may be of any desired shape and size and may have a decorative design for pleasing looks. In essence, this grill serves to prevent larger objects from entering the purifier. The air, after passing through the inlet grill 2, then passes through an electrostatic filter 3. In essence, the electrostatic filter 3 simply maintains a strong electrostatic field between a plurality of positive and negative electrodes.

This electrostatic filter consists of a fine glass filament filtering medium which is compressed into a thin porous sheet and bonded together. Upon this sheet are imprinted positive and negative electrodes which consist of strips of electrically conductive ink or paint. These filter sheets are then folded accordion-wise and bonded together in the electrostatic filter cell. When these filter cells have acquired a full dust load, they may be shaken clean and reused, or removed and replaced with new clean cells.

A simple power pack sets up the strong electrostatic field in more than 84 sq. ft. of filtering surface. This electrostatic field charges, attracts and holds approximately 90% of foreign matter in the air passing through the filter.

The above describes in general the manner in which the electrostatic filter functions. These electrostatic filters can be purchased from a number of sources, specifically, the American Air Filter Company, Louisville, Kentucky. This particular electrostatic filter is designated as "Electro-Klean" and is described in their pamphlet #256–E2, dated March 1957. The size of the electrostatic filter used will be dependent upon the number of operating factors, including the amount and type of air to be processed. In general, an electrostatic filter cell of the type herein described, 20 x 25 x 2 inches will handle approximately 550–650 cubic feet of air per minute.

The electrostatic filter is removable so that it can be readily cleaned or replaced as necessary. The frequency of cleaning or replacement will be a function of the quantity and the character of the air being processed. A portion of the air after passage through the electrostatic filter is passed into humidification area 4 by means of port 20. In this section the air is passed upwardly through a fine spray of water which may contain added chemicals such as sodium hydroxide or other alkalis. Under certain conditions if acidic substances are present, such as sulphur dioxide and sulphur trioxide, it is very desirable to have the spray on the alkaline side. This spray may be secured by any satisfactory spray means or spray heads.

The spray is secured by spray means 5, which may be either directed upwardly or downwardly. Generally, it is preferred to have the spray directed downwardly and have the air flowing upwardly through the spray. A satisfactory spray nozzle may be secured from any satisfactory source. A very desirable spray is one manufactured by the Walton Humidifier Company, described in their catalog #7756. It is desirable to have the spray drawn off by means of suitable conduits and passed to a storage tank and then recirculated by means of a pump.

The humidification-dehumidification areas are so designed so that approximately 20–40 percent of the total inlet air will pass through these particular areas. This is secured by having proper balancing valves so as to permit approximately 60–80 percent of the air to by-pass the humidification-dehumidification area. In accordance with the present apparatus, this by-passed air passes from the electrostatic filter around the humidification-dehumidification areas through a conduit or passageway 6.

The air being processed after passage through the spray or humidifying area then is passed over an evaporator coil 7 of a mechanical-refrigeration type of dehumidifier wherein the excess moisture containing contaminants is condensed and drained away.

In general, it is preferred to pass approximately 20–40 percent of the air being processed through the humidifying-dehumidifying areas. Thus, if the unit were designed for approximately 400 cubic feet per minute, about 100 cubic feet per minute are passed through the humidifying chamber and the dehumidifying area.

While the apparatus is designed to pass only about 20–40 percent of the air through the humidifying-dehumidifying areas, it is to be understood that the air in a given area being treated, as for example, in a room, will pass through the air purifier a multiplicity of times and each time, a 20–40 percent portion will pass through these areas. Thus, when in use, wherein the air in a room, for example, is being recirculated many times, complete removal of contaminants, such as dust, sulphur dioxide and the like, is effectively secured by the present apparatus.

While it is preferred that the removal of contaminants be accomplished by a humidifying section as described with the use of water spraying, it is to be understood that other materials, such as solid absorbent, could be used either alone or in combination with the spray.

The refrigerant circulated through condensing coil 7 by means of compressor 8, may be any suitable refrigerant, as for example, Freon 12 (difluorodichloro methane); or an equivalent refrigerant.

The cooled, clean air after passing through the spray and over condensing coil 7 is then passed into the blower area 11 wherein this relatively smaller quantity of air is combined with the relatively larger quantity of air which by-passed these areas. Satisfactory circulation is secured by means of air blower 9, motivated by the blower motor 10. The processed air is then passed into the room being purified by means of a satisfactory air outlet conduit 12.

Figure 3:
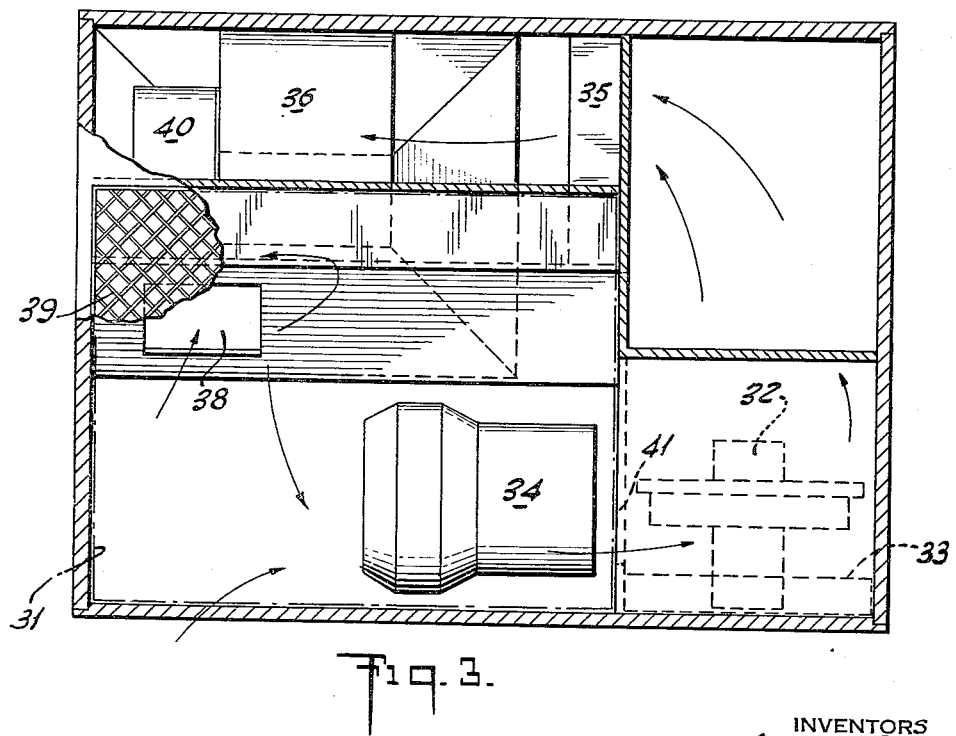

Referring specifically to FIGURES 2, 3, 4 and 5 which illustrate another adaptation of the invention, FIGURE 2 is a top view of the apparatus; FIGURE 3 is a back section of the apparatus, while FIGURES 4 and 5 are end sections.

Referring specifically to FIGURE 2, air enters the apparatus through grill 39, passes through electrostatic filter 31 into passageway 42. A smaller portion of the total air flow passes through gate valve 41 and into the humidification section. In this area the air flows upwardly and counter-currently contacts a downflowing aqueous spray which may contain, as hereinbefore pointed out, various chemicals such as sodium hydroxide. The wet air then passes upwardly and through evaporation coil 35. Excess moisture containing contaminants is condensed and removed by suitable means. The air then passes into blower and housing area 36 wherein the air is combined with the larger quantity of air from passageway 42 which by-passed the humidification and evaporation sections. The combined stream is discharged into the room in which the air is being purified.

Referring specifically to FIGURE 3 wherein similar elements disclosed in FIGURE 2 are designated by the same number, it is seen that the smaller quantity of air from passageway 42 passes upwardly and contacts a downflowing spray from humidifier 32. This spray is collected in pan 33 disposed of, or handled for recirculation as desired. The wet air flows upwardly and through evaporation area 35 wherein excess moisture containing contaminants is condensed and further handled as desired. This air is then introduced and further handled as desired. This air is then introduced into blower and housing area 36 which is motivated by motor 40.

This smaller quantity of air from the evaporation area is combined with the larger quantity of air from passageway 42, which passes into the blower housing section through by-pass gate valve 38. Compressor 34 condenses the refrigerant used in evaporator coil 35.

Referring specifically to FIGURE 4, which shows the evaporator-humidifier end of the apparatus, it is seen that the smaller quantity of air from passageway 42 passes through gate valve 41, upwardly under humidifier 32, and upwardly and through evaporator coil 35.

Referring specifically to FIGURE 5, which illustrates the compressor-filter end of the apparatus, it is seen that incoming air flows through grill 39, thence through electrostatic filter 31 and to passageway 42. Passageway 42 is in communication with the humidifier area by means of valve 41 and is in communication with the blower and housing area by means of by-pass gate valve 38. Thus, by controlling the relative openings of these respective valves, the amount of air flowing into the humidification and evaporation sections as compared to the amount of air flowing directly into the housing area of the blower, is positively controlled. The combined purified air stream is exhausted to the room as illustrated.

In order to further illustrate, the following example is given.

Prototypes of this invention were tested at 20 times the highest concentration of sulphur dioxide normally found in air. Sulphur dioxide gas was generated on a continuing basis by exposing an acidified solution of calculated weight of $Na_2SO_3$. Air samples were taken of outlet air until $SO_2$ could be detected in outlet air. It was found that the unit was capable of removing 20 p.p.m. $SO_2$ from the air over a period of four to five hours continuous operation. It was also found that 40 p.p.m. sulphur dioxide was removed continuously over a period of four hours. Thus, the unit is capable of removing amounts of sulphur dioxide found in urban air for periods of five hours if water is the humidifying agent. The use of an 0.2% solution of sodium hydroxide in the humidifier unit will prolong the effective removal to a period of approximately one week.

From the foregoing it is evident that the process and apparatus of the present invention are most effective for the purification and for the cleansing of contaminated air.

With the foregoing objects in view, the invention resides in the novel arrangement and combination of parts and in the details of construction and process of manufacture hereinbefore described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing, and that the structural details or particular steps of the method herein set forth may be varied to suit particular purposes and still remain within the inventive concept.

What is claimed is:

1. Improved process for the purification of air which comprises passing a fixed quantity of feed air through an electrostatic field, thereafter segregating a minor proportion and major proportion of said air, passing said minor proportion of said air through a spray humidifying area, thence through a condensing dehumidifying area for the removal of excess spray containing contaminants, passing said major proportion of said air around said humidifying-dehumidifying area and thereafter combining said minor portion of air with said major proportion which by-passed said humidifying-dehumidifying area, and passing the same into a room the air of which is being purified and recirculating additional quantities of feed air from said room to said electrostatic field.

2. Process as defined by claim 1, wherein said spray contains an alkaline material.

3. Process as defined by claim 2, wherein said alkaline material comprises sodium hydroxide.

4. Improved apparatus for the removal of harmful constituents from air which comprises a housing, an air inlet, an electrostatic filter positioned in said housing adjacent said air inlet, a spray humidifying chamber positioned adjacent and downstream of said electrostatic filter, fluid passageways communicating from the area downstream said filter to within said spray humidifying chamber, spray means within said spray chamber, a condensing dehumidifying coil positioned downstream of said spray chamber and above the horizontal plane of said spray means, a blower element positioned in an area downstream of said condensing dehumidifying coil, an air outlet from said latter area to without said housing, and a communicating passageway from said area between said filter and said spray humidifying chamber to the area in which said blower is positioned, whereby air being processed will be segregated into two streams, one stream of which will by-pass the spray humidifying chamber and the condensing dehumidifying coil.

5. Apparatus as defined by claim 4 wherein gate valves are positioned in a manner to control the quantities of air flowing into the respective streams.

6. Process as defined by claim 1 wherein said minor proportion comprises about 20 to 40% of said feed air and said major proportion comprises about 60 to 80% of said feed air.

7. Apparatus as defined by claim 4 wherein the exits from said fluid passageways are so positioned with respect to said spray means that countercurrent flow will be secured with respect to spray from said spray means and said fluid from said fluid passageways.

8. Process as defined by claim 1 wherein said minor proportion of air is cooled in said condensing-dehumidifying area.

References Cited in the file of this patent

UNITED STATES PATENTS

| | | |
|---|---|---|
| 1,442,619 | Lamb | Jan. 16, 1923 |
| 2,035,628 | Whitmer et al. | Mar. 31, 1936 |
| 2,379,932 | Schoepflin et al. | July 10, 1945 |
| 2,729,302 | True | Jan. 3, 1956 |
| 2,868,319 | Rivers | Jan. 13, 1959 |
| 2,908,347 | Roos | Oct. 13, 1959 |